US010762517B2

(12) United States Patent
Vadakattu et al.

(10) Patent No.: US 10,762,517 B2
(45) Date of Patent: Sep. 1, 2020

(54) SUBSCRIPTION CHURN PREDICTION

(71) Applicant: eBay Inc., San Jose, CA (US)

(72) Inventors: Rama Krishna Vadakattu, Karnataka (IN); Bibek Panda, Bangalore (IN); Swarnim Narayan, Jharkhand (IN); Harshal Godhia, Mumbai (IN)

(73) Assignee: eBay Inc., San Jose, CA (US)

( * ) Notice: Subject to any disclaimer, the term of this patent is extended or adjusted under 35 U.S.C. 154(b) by 792 days.

(21) Appl. No.: 14/986,476

(22) Filed: Dec. 31, 2015

(65) Prior Publication Data

US 2017/0004513 A1 Jan. 5, 2017

(51) Int. Cl.
G06Q 30/02 (2012.01)
G06N 20/00 (2019.01)
G06N 5/00 (2006.01)

(52) U.S. Cl.
CPC ......... *G06Q 30/0202* (2013.01); *G06N 5/003* (2013.01); *G06N 20/00* (2019.01)

(58) Field of Classification Search
CPC ........... G06Q 30/0202; G06Q 30/0201; G06Q 30/0204; G06Q 30/2017; G06N 5/04; G06N 99/005; H04N 21/2543; Y04S 50/14; H04M 2215/0108; H04L 12/2485
See application file for complete search history.

(56) References Cited

U.S. PATENT DOCUMENTS

| 5,822,410 | A | * | 10/1998 | McCausland | ......... H04M 15/00 379/114.01 |
| 8,266,009 | B1 | * | 9/2012 | Devlin | .................. G06Q 40/00 705/26.3 |
| 8,417,715 | B1 | * | 4/2013 | Bruckhaus | ............ G06Q 10/04 707/758 |
| 8,442,854 | B2 | * | 5/2013 | Lawton | ................ G06Q 10/063 705/7.29 |

(Continued)

OTHER PUBLICATIONS

"Computer assisted customer churn management: State-of-the-art and future trends," John Hadden, et al., 2005, Computers & Operations Research, vol. 34, Issue 10, Oct. 2007, pp. 2902-2917, available on ScienceDirect at <https://www.sciencedirect.com/science/article/pii/S0305054805003503>.*

(Continued)

*Primary Examiner* — Tyler W Knox
(74) *Attorney, Agent, or Firm* — Holland & Hart LLP

(57) ABSTRACT

A churn prediction system includes at least one hardware processor, a memory including a historical sample set of subscriber data, and a churn prediction engine executing on the at least one hardware processor. The churn prediction engine is configured to identify the historical sample set, identify a set of attributes, automatically select a subset of attributes based on an information gain value, generate a decision tree by recursively generating nodes of the decision tree by computing an information gain value for each remaining attribute of the subset of attributes, identifying a highest attribute having the highest information gain value, (Continued)

and assigning the highest attribute to the node. The churn prediction engine is also configured to receive target data for a target subscriber, apply the target data to the decision tree, thereby generating a churn prediction for the target subscriber, and identify the target subscriber as a churn prediction.

18 Claims, 5 Drawing Sheets

(56) References Cited

U.S. PATENT DOCUMENTS

| | | | | |
|---|---|---|---|---|
| 8,799,814 | B1* | 8/2014 | Bryc | G06Q 30/0242 705/14.1 |
| 9,727,603 | B1* | 8/2017 | Heiler | G06F 17/30401 |
| 9,830,632 | B2* | 11/2017 | Lenahan | G06Q 30/0625 |
| 9,880,714 | B2* | 1/2018 | Gabbai | G06F 17/3064 |
| 10,185,975 | B2* | 1/2019 | Sinha | G06Q 30/0257 |
| 2002/0004735 | A1* | 1/2002 | Gross | G06Q 30/0214 705/26.41 |
| 2003/0229531 | A1* | 12/2003 | Heckerman | G06Q 30/02 705/14.41 |
| 2004/0088730 | A1* | 5/2004 | Gopalan | H04N 7/16 725/93 |
| 2005/0096880 | A1* | 5/2005 | Morita | G06N 5/04 702/189 |
| 2005/0097028 | A1* | 5/2005 | Watanabe | G06Q 10/10 705/37 |
| 2006/0004701 | A1* | 1/2006 | Bacon | G06Q 10/00 |
| 2006/0178918 | A1* | 8/2006 | Mikurak | G06Q 10/06 705/7.25 |
| 2008/0077544 | A1* | 3/2008 | Sureka | G06K 9/6253 706/13 |
| 2008/0097872 | A1* | 4/2008 | Peckover | G06Q 30/02 705/26.43 |
| 2008/0168093 | A1* | 7/2008 | De Marcken | G06F 16/24539 |
| 2008/0205515 | A1* | 8/2008 | Kalva | H04N 19/196 375/240.02 |
| 2009/0190729 | A1* | 7/2009 | Chakraborty | G06Q 10/00 379/112.01 |
| 2011/0137842 | A1* | 6/2011 | Rotondo | G06N 7/005 706/21 |
| 2011/0219035 | A1* | 9/2011 | Korsunsky | G06F 21/00 707/784 |
| 2011/0225293 | A1* | 9/2011 | Rathod | G06F 17/30867 709/224 |
| 2012/0036123 | A1* | 2/2012 | Hasan | G06F 17/30386 707/723 |
| 2013/0054306 | A1* | 2/2013 | Bhalla | G06Q 30/02 705/7.31 |
| 2013/0211873 | A1* | 8/2013 | Varadarajan | G06Q 50/01 705/7.28 |
| 2013/0346157 | A1* | 12/2013 | Avrilionis | G06Q 30/0206 705/7.35 |
| 2014/0119522 | A1* | 5/2014 | Phadke | H04M 15/44 379/133 |
| 2014/0136284 | A1* | 5/2014 | Reynolds | G06Q 10/06 705/7.32 |
| 2014/0310243 | A1* | 10/2014 | McGee | G06Q 10/101 707/639 |
| 2015/0032680 | A1* | 1/2015 | Cichosz | G06F 16/28 706/50 |
| 2015/0120386 | A1* | 4/2015 | Sherman | G06Q 30/0202 705/7.31 |
| 2015/0256499 | A1* | 9/2015 | Kumar | G06F 16/958 709/206 |
| 2015/0339572 | A1* | 11/2015 | Achin | G06N 5/02 706/46 |
| 2015/0371163 | A1* | 12/2015 | Noh | G06Q 10/0635 705/7.28 |
| 2016/0063560 | A1* | 3/2016 | Hameed | G06Q 30/0264 705/14.61 |
| 2016/0078347 | A1* | 3/2016 | Salajegheh | G06N 20/00 706/12 |
| 2016/0225025 | A1* | 8/2016 | Sinha | G06Q 30/0257 |
| 2017/0172493 | A1* | 6/2017 | Rahman | A61B 5/7275 |
| 2017/0220943 | A1* | 8/2017 | Duncan | G06Q 30/0201 |

OTHER PUBLICATIONS

"Telecommunication Subscribers' Churn Prediction Model Using Machine Learning" by Saad Ahmed Qureshi, et al., published at IEEEXplore, 2013.*
Longanecker, "Why You Should Use a Subscription Business Model," Entrepreneur Media, Retrieved from the Internet URL: https://www.entrepreneur.com/article/243573, Mar. 19, 2015, 1 Pages.
"Why Get an eBay Store," Retrieved from the Internet URL: https://pages.ebay.com/seller-center/run-your-store/why-get-an-ebay-store.html, Accessed on Apr. 20, 2020, 4 Pages.
Axelsson, "The Base-Rate Fallacy and Its Implications for the Difficulty of Intrusion Detection," Proceedings of the 6th ACM Conference on Computer and Communications Security, Nov. 1999, 7 pages.
Gordon, "Recall-Precision Trade-Off: A Derivation," Journal of the American Society for Information Science, vol. 40, No. 3, Mar. 1988, 20 pages.
Quinlan, "Induction of Decision Trees," Machine Learning, vol. 1, 1986, 26 pgs.
"Dynamic Time Warping," Information Retrieval for Music and Motion, Retrieved from the Internet URL: https://link.springer.com/chapter/10.1007/978-3-540-74048-3_4, 2007, 2 pages.
Xiaopeng, "Fast Time Series Classification Using Numerosity Reduction," Proceedings of the 23rd International Conference on Machine Learning, Jun. 2006, 8 pgs.
Martinez-Jerez, et al., "HubSpot: Lower Churn through Greater CHI," Harvard Business School Case 110-052, Jan. 2010, 2 pages.
Breiman, "Classification and Regression Trees," Retrieved from the Internet URL: https://inspirehep.net/literature/1382689, 1984, 1 page.
Quinlan, "C4.5: Programs for Machine Learning," vol. 16, 1994, 6 pgs.
Japkowicz, "The Class Imbalance Problem: Significance and Strategies," Proceedings of the International Conference on Artificial Intelligence (ICAI), 2000, 7 pages.
Han, "Borderline-SMOTE: A New Over-Sampling Method in Imbalanced Data Sets Learning," Advances in Intelligent Computing, 2005, 10 pgs.
Au, et al., "A Novel Evolutionary Data Mining Algorithm with Applications to Churn Prediction," IEEE Transactions on Evolutionary Computation, vol. 7, Issue 6, Dec. 2003, 14 pgs.
Xie, "Customer Churn Prediction Using Improved Balanced Random Forests," Expert Systems with Applications, vol. 36, Issue 3, Part 1, Apr. 2009, 5 pgs.

* cited by examiner

SUBSCRIPTION CHURN PREDICTION

CROSS-REFERENCE TO RELATED APPLICATIONS

This application claims the benefit of India Patent Application No. 3353/CHE/2015, filed Jul. 1, 2015, which is incorporated herein by reference in its entirety.

TECHNICAL FIELD

Embodiments of the present disclosure relate generally to subscription services in an online content system and, more particularly, but not by way of limitation, to predicting user turnover or churn in an online subscription service.

BACKGROUND

Some online service providers enable their users, or "subscribers," to enroll in a subscription-based service. For example, an online marketplace may offer a subscription service to some of their customers, such as their sellers. These subscribers pay for their services for a period of time rather than, for example, per transaction, or per listing, or per other unit of service. Over time, some subscribers may cancel their subscription—a phenomena commonly known as "customer churn," or simply "churn."

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

For an online service provider offering a subscription model for their online service, it may be a costly endeavor to acquire new subscribers to their services. For example, these costs may include advertising campaigns (e.g., to inform potential users of their services), adding additional services and features (e.g., to distinguish their services from their competitors), and educational services to ease new users into use (e.g., so they do not immediately get frustrated and abandon the service), to name but a few. It may be a less-costly prospect to maintain existing customers. As such, online service providers may focus on "customer retention." Further, the online service providers may benefit from a system that can predict which of their existing subscription users may cancel their subscriptions in the near future, as they may then reach out to these customer pro-actively prior to cancellation.

A churn prediction engine and associated systems and methods for predicting subscriber churn are described herein. The churn prediction engine performs engineering methods to generate a decision tree model for churn prediction, sampling techniques for handling class imbalance, methods to address false alarms, and ranking algorithms for verifying the integrity of predictions.

As used herein, the term "subscriber churn," or just "churn," is used generally to refer to subscribers cancelling their subscriptions to an online service system. In other words, a level of churn refers to the level of turnover of subscribing users (e.g., the number of subscribers that cancel each month). For some online service providers, low churn is desired so as to retain as many of their existing customers as possible.

Figure 1:
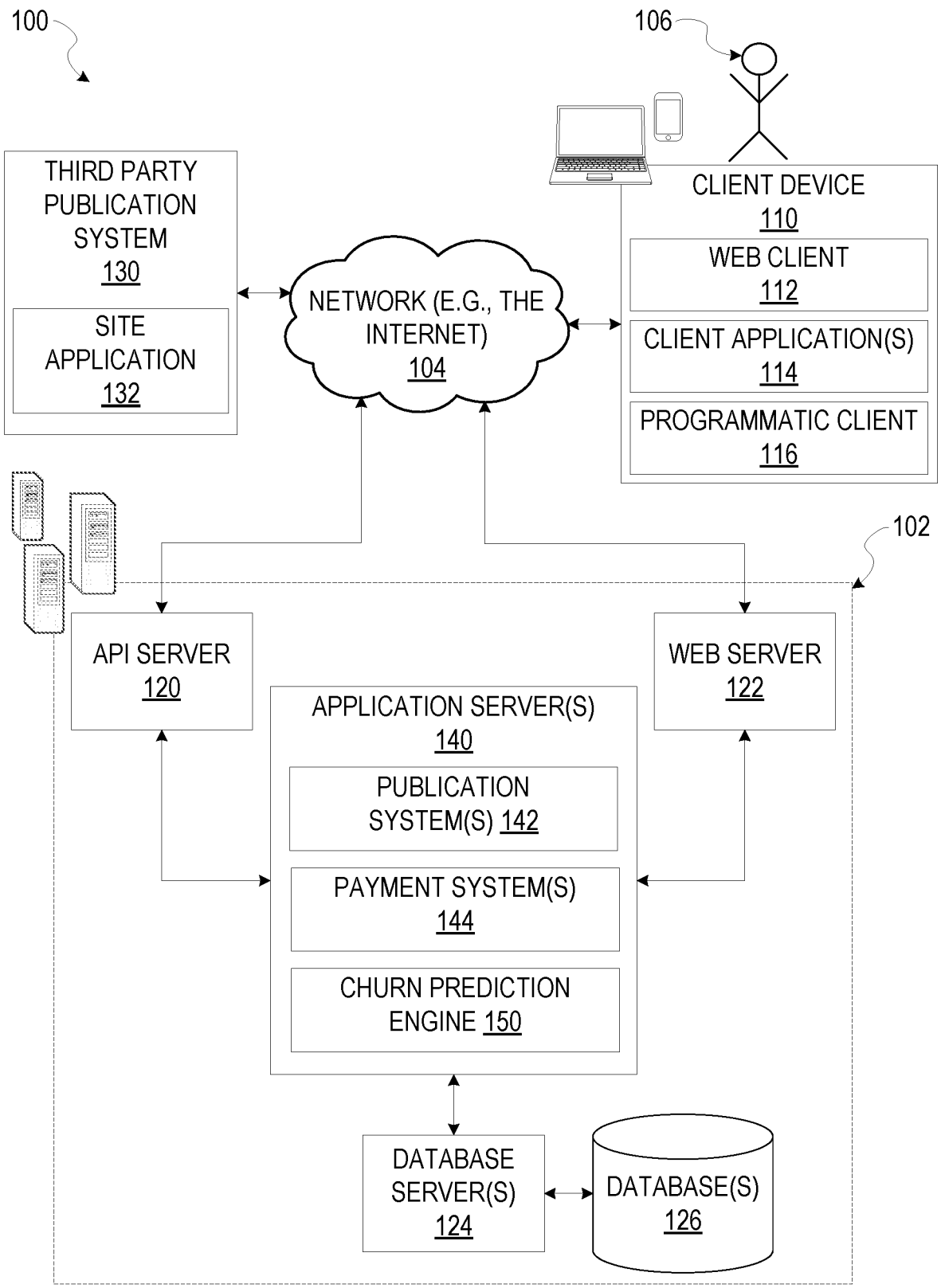
FIG. 1 illustrates a network diagram depicting an example churn prediction system.

FIG. 1 illustrates a network diagram depicting an example churn prediction system 100. In the example embodiment, the churn prediction system 100 includes a networked system 102 that provides online subscription services to online users (or "subscribers"), such as a user 106 via a client device 110. The networked system 102 includes a churn prediction engine 150 for generating churn predictions for the subscribers as described herein. In some embodiments, a third party publication system 130 provides online subscription services to the online users and the churn prediction engine 150 provides churn prediction services to that third party based on their subscribers' data.

The networked system 102 provides network-based, server-side functionality, via a network 104 (e.g., the Internet or Wide Area Network (WAN)), to the client devices 110 that may be used, for example, by sellers or buyers (not separately shown) of products and services offered for sale through the publication system 142 (e.g., an online marketplace system, provided by publication systems 142 or payment systems 144). FIG. 1 further illustrates, for example, one or both of a web client 112 (e.g., a web browser), client application(s) 114, and a programmatic client 116 executing on client device 110.

Each of the client devices 110 comprises a computing device that includes at least a display and communication capabilities with the network 104 to access the networked system 102. The client device 110 includes devices such as, but not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client devices 110 connects with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more applications (also referred to as "apps") 114 such as, but not limited to, a web browser, messaging application, electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities with the application configured to communicate with the networked system 102, on an as needed basis, for data or processing capabilities not locally available (e.g., such as access to a database of items available for sale, to authenticate a user, to verify a method of payment). Conversely, if the e-commerce site application is not included in a given one of the client devices 110, the given one of the client devices 110 may use its web client 112 to access the e-commerce site (or a variant thereof) hosted on the networked system 102. Although only one client device 110 is shown in FIG. 1, two or more client devices 110 may be included in the churn prediction system 100.

An Application Program Interface (API) server 120 and a web server 122 are coupled to, and provide programmatic and web interfaces respectively to, one or more application servers 140. In the example embodiment, the application servers 140 host the churn prediction engine 150 that facilitates providing prediction services, as described herein. The application servers 140 are, in turn, shown to be coupled to one or more database servers 124 that facilitate access to one or more databases 126.

In some embodiments, the application servers 140 host one or more publication systems 142 and payment systems 144. The publication system 142, may provide a number of e-commerce functions and services to users that access networked system 102 and/or external sites 130. E-commerce functions/services may include a number of publisher functions and services (e.g., search, listing, content viewing, payment, etc.). For example, the publication system 142 may provide a number of services and functions to users for listing goods and/or services or offers for goods or services for sale, searching for goods and services, facilitating transactions, and reviewing and providing feedback about transactions and associated users. Additionally, the publication system 142 may track and store data and metadata relating to listings, transactions, and user interactions. In some embodiments, the publication system 142 may publish or otherwise provide access to content items stored in application servers 140 or databases 126 accessible to the application servers 140 or the database servers 124. The payment system 144 may likewise provide a number of payment services and functions to users. The payment system 144 may allow users to accumulate value (e.g., in a commercial currency, such as the U.S. dollar, or a proprietary currency, such as "points") in accounts, and then later to redeem the accumulated value for products or items (e.g., goods or services) that are made available via the publication system 142. While the publication system 142 and payment system 144 are shown in FIG. 1 to both form part of the networked system 102, it will be appreciated that, in alternative embodiments, the payment system 144 may form part of a payment service that is separate and distinct from the networked system 102. In other embodiments, the payment system 144 may be omitted from the churn prediction system 100. In some embodiments, at least a portion of the publication system 142 may be provided on the client devices 110.

Further, while the churn prediction system 100 shown in FIG. 1 employs a client-server architecture, embodiments of the present disclosure are not limited to such an architecture, and may equally well find application in, for example, a distributed or peer-to-peer architecture system. The various publication and payment systems 142 and 144 may also be implemented as standalone software programs, which do not necessarily have networking capabilities.

The client devices 110 access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 116 and the networked system 102.

In the example embodiment, the networked system 102 provides one or more subscription-based services to users 106. The users 106 may be sellers in an online marketplace (e.g., the publication system 142 and the payment system 144), receiving subscription services associated with the selling of products and services through the online marketplace to other users. During the course of operation, the networked system 102 collects various historical data associated with the activities of the seller 106 (e.g., listings information, completed sales information, activity information, and so forth). The networked system 102 also collects information about when some of those sellers 106 subsequently cancelled their subscriptions, or churned. The churn prediction engine 150 analyzes this historical data across many sellers 106 to build a prediction model for predicting when sellers are likely to cancel. The prediction model may then be used with later sellers 106 (e.g., before they cancel their subscriptions) to identify those that may be "at risk" of cancelling.

Figure 2:
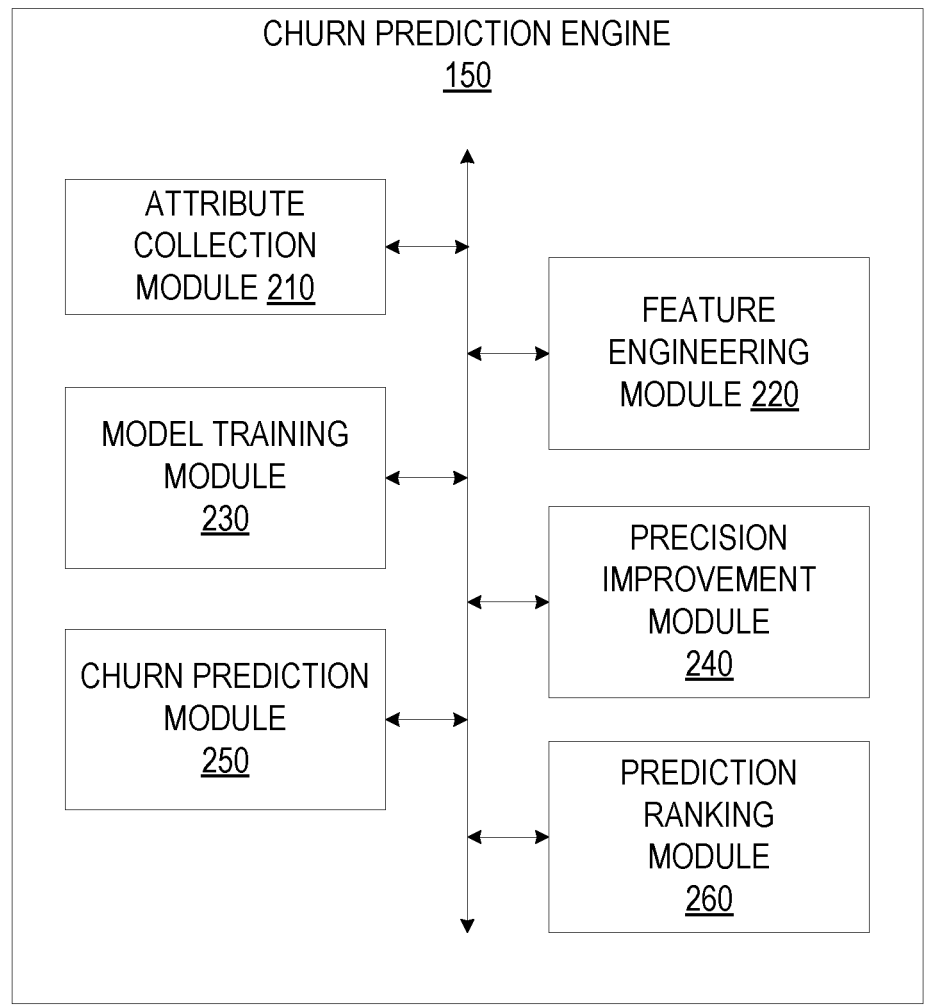
FIG. 2 is a block diagram showing components provided within the churn prediction engine according to some embodiments.

FIG. 2 is a block diagram showing components provided within the churn prediction engine 150 according to some embodiments. The churn prediction engine 150 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124 (both shown in FIG. 1).

The churn prediction engine 150 provides a number of churn prediction features whereby the churn prediction engine 150 analyzes user data associated with subscription users, generates a prediction graph, or "churn model," and applies additional features to improve performance of the churn model.

To this end, the example churn prediction engine 150 includes an attribute collection module 210, a feature engineering module 220, a model training module 230, a precision improvement module 240, a churn prediction module 250, and a prediction ranking module 260.

In analyzing and predicting churn for subscription users, some of the examples described herein analyze sellers in an online marketplace. For ease of understanding, presume the sellers are "monthly" subscribers (e.g., their enrollment is ongoing, but may be paid monthly, or they may cancel at any time, and only may be out a single month's subscription fee). As such, the subscribers may be divided into two classes each month: those that cancel their subscriptions, or "churn," during that month (referred to herein as "churns") and those that continue to maintain their active subscriptions (referred to herein as "survivors").

In the example embodiment, the attribute collection module 210 identifies user data associated with the subscription users 106 occurring in an online environment, such as the online services offered by the networked system 102. In some embodiments, the online environment is an online marketplace such as the publication system 142 or a third party marketplace supported by an external site 130.

Online sellers 106 generate user data over time and through use of the networked system 102 such as transactional data (e.g., data about their published listings, sales, revenue, inventory, and so forth) and site activity (e.g., web pages visited, number of logins, length of subscription, and so forth). This user data may be referred to herein, and collectively, as "attribute data" or "feature data" of the subscription seller(s) 106. In some contexts, this attribute data may be "historical data" associated with a set of sellers that is used for model training (e.g., the input data used to train a prediction model). In other contexts, this attribute data may be "target user data" associated with a particular seller for which a churn prediction is computed (e.g., an application of the prediction model to the particular seller).

The attribute collection module 210 collects the user data of the subscription users (e.g., sellers), both for model training purposes and for model application purposes. In some embodiments, the attribute collection module 210 may retrieve data from the databases 126 of the networked system 102 (e.g., data as generated by the publication systems 142 and payment systems 144). In other embodiments, the attribute collection module 210 may retrieve or receive data from the third party publication system 130, or the client devices 110. The attribute collection module 210 provides this attribute data to the feature engineering module 220.

The feature engineering module 220 prepares the historical data prior to use in training the prediction model. The historical data processed by the feature engineering module 220 may be grouped into several classes of attributes (e.g., attributes of subscription sellers, in this example): (1) customer demographic information (e.g., seller's country of residence, seller's segment, and so forth); (2) subscription details (e.g., subscription service level, subscription contract period, and so forth); (3) event data (e.g., listings data, gross merchandise value (GMV), activity data such as quantity sold, revenue data, and so forth); (4) domain specific data (e.g., seller feedback rating, number of returns, number of repeat customers, and so forth); and (5) behavioral data (e.g., number of page visits, number of logins, and so forth). In some embodiments, the attributes may include one or more of the following:

FullTermgmvrevenue
Midtermgmvrevenue
Mostrecentgmvdip
Adaptivegmvavgdip
Midtermgmvavgdip
Numgmvzeroinfullterm (# times a seller gmv is zero in last year)
Alltimegmvlow
Gmvstandaradeviation
GMVyearonnyearchange
Lastgmvnormed
Fulltermactivelistingsrevenue
Midtermactivelistingsrevenue
Midfull activelistingsratio
Mostrecent activelistingsdip
Adaptive activelistingsavgdip
Midterm activelistingsavgdip
Numactivelistingszeroinfullterm
Alltimeactivelistingslow
Activelistingsstandardtdeviation
Activeli stingsyearonyearchange
Lastactivelistingsnormed
SellerStandardLevel
Sellersegment
Monthlyoryearly Subscription
StoreLevel
Category The feature engineering module 220 evaluates the historical data to identify a set of attributes (e.g., portions or fields of the historical data) to use in training the prediction model. In some embodiments, the feature engineering module 220 implements Waikato Environment for Knowledge Analysis (WEKA) machine learning software and, more particularly, the "Attribute Evaluator" library, to perform attribute selection and ranking. The feature engineering module 220 computes an information gain value (IGV) for each of the attributes, then selects a set of attributes based, at least in part, on the information gain values. For example, Table 1 shows the top four attributes of an example subset of attributes:

TABLE 1

Information Gain Values

| Attribute Name | Information Gain Value (IGV) |
| --- | --- |
| Normalized active listings of seller for last month | 0.16576 |
| Dip in the active listings in the most recent month | 0.13476 |
| Normalized GMV | 0.13177 |
| Seller Store Age | 0.02138 |

As such, and for example, the feature engineering module 220 may select the four attributes listed in Table 1 as training attributes for training the prediction model. The feature engineering module 220 may select a pre-defined number of attributes based on IGV (e.g., the top n attributes), or may select all attributes having an IGV value above a pre-determined threshold (e.g., all attributes having IGV>x).

The feature engineering module 220 may construct or compute one or more attributes from the subscriber data. These custom attributes are referred to herein as "fabricated attributes." The fabricated attributes may, for example, be computed based on one or more other attributes (e.g., "past four months, sales, moving average", or "number of consecutive months of $0 in sales"). These computations may be made in the application RAM in phyton, and partly in R. Once computed, these fabricated attributes may also be candidates for selection.

In some embodiments, one or more of these fabricated attributes, or any of the other attributes, may be pre-identified (e.g., by an analyst) for inclusion in the selected set of attributes. In other words, some of the attributes may be used regardless of their IGV. For example, an analyst may engage some past (e.g., churned) subscribers directly, or through online inputs, to determine why they cancelled their subscriptions. The analyst may generate some insight into a new factor for churn that may be influential in predicting churn. As such, the analyst may generate a fabricated attribute, or identify an already-existing attribute, and may force that attribute to be used in building the prediction model.

In some embodiments, the feature engineering module 220 calculates a baseline accuracy. With some subscription services, the rate of cancellation may be an uncommon or rare event. As such, the baseline accuracy may indicate a class imbalance within the training data set (e.g., many more survivors than churns). Analysis under such situations may lead to a phenomena of "base rate fallacy." This result may affect how the training data is selected from all of the historical data.

In some embodiments, the training data set may be selected as a subset of random data points from the historical data. In the example embodiment (e.g., in situations in which the training data exhibits class imbalance), the feature engineering module 220 may equisample both churn and survivor classes to form the training data set (e.g., undersampling the majority class of survivors, and oversampling the minority class of churns). In other embodiments, the training data set may be selected such as to artificially alter the minority class in relation to the majority class, such as, for example, through Synthetic Minority Over-Sampling Technique (SMOTE) or Borderline SMOTE.

Further, the feature engineering module 220 selects the training data set such as to approximate the distribution of the feature space of the actual population. More specifically, the historical data points are clustered into K groups (e.g., stratified clustering). Then, from each group, a number of data points are selected, keeping a portion of sampling from each group to be the same. As such, more sampling is enabled from denser regions and less from sparse regions, and distribution of the data is maintained in the sample set (e.g., as compared to the entire historical set of data). This method may be performed as a hybrid form of stratified subsampling where the strata are the clusters.

Once the training set has been identified by the feature engineering module 220, the model training module 230 trains the prediction model using the selected attributes ("training attributes") and training data set identified by the feature engineering module 220. In the example embodiment, the model training module 230 builds a decision tree based on information entropy. In other words, the prediction model becomes a decision tree, once built. As such, the terms "decision tree" and "prediction model" may be used interchangeably herein.

In the example embodiment, the model training module uses the C4.5 algorithm to build the decision tree. Each non-leaf node in the resulting decision tree represents a decision point based on one of the training attributes. Each non-leaf node, or decision point, identifies an attribute associated with the node, as well as one or more threshold levels or discrete values associated with the node's assigned attribute. The non-leaf nodes have one or more child nodes attached to the non-leaf node (e.g., one associated with being over a threshold, the other associated with being under the threshold). Each leaf node has no children and, as such, represents a final classification value (e.g., either "churn" or "survivor").

To build the decision tree, starting from the root node, and recursively for each subsequent child node created, the model training module 230 computes information gain values (IGVs) for each of the remaining training attributes (e.g., those attributes not yet addressed as a decision point by a node in the present node's direct lineage back to the root node), and over the training data set. The remaining training attribute having the highest IGV is selected and assigned as the attribute associated with the present node.

Further, a threshold value is computed for the present node. The node's threshold value, combined with the particular attribute of the node, defines the rule for which direction or branch of the decision tree is taken during a prediction analysis for a target subscriber. In other words, and for example, if the target subscriber's attribute is above the threshold value, the analysis would branch to a first child node, else the analysis would branch to a second child node. The model training module 230 computes the threshold value based on the C4.5 algorithm (e.g., based on the IGV).

If the present node is determined to have one or more children (i.e., to be a non-leaf node), then the model training module 230 creates each of the child nodes and recurses for each (e.g., evaluating each child node as described above). If the present node is determined to be a leaf node, as described above, then no deeper recursion is performed on the present node, and the present node recursion terminates and returns. This determination is made as a part of the C4.5 algorithm, but is based on a lower bound value (e.g., a "minimum bucket size") provided to the algorithm that determines when to terminate the recursion (e.g., to stop splitting the current bucket into another lower level). As such, overfitting may be controlled by the model training module 230 (e.g., to avoid too large or too deep of a tree). In some embodiments, the model training module 230 also disables pruning in the C4.5 algorithm.

Further, the model training module 230 also introduces a bias by increasing the prediction threshold for predicting a bucket (e.g., leaf node) as churn to higher than 50%. For example, the model training module 230 may increase the threshold to 70% or 80%. In other words, a leaf node with less than, for example, 70% of the remaining samples being churns would result in that bucket being labelled as "survivor" rather than "churn." This bias may improve on the number of false alarms generated by the prediction model.

The churn prediction engine 150 also includes a precision improvement module 240 that focuses on improving the performance of the prediction models for subscribers. The prediction models described herein may generate a number of "false alarms," based on training data or during application of the model to the target subscribers. The term "false alarm" is used to refer to the situation when the prediction model generates a prediction (e.g., classification) that a particular seller (historical or current) is in the churn class when the seller is actually a survivor (e.g., for that particular month). The term "precision" is used herein to refer to how reliably those classified as churns actually churn. In other words, better precision yields a lower number of false alarms. Further, the term "recall" is used herein to refer to how reliably the actual churns were properly identified in the churn class. In some situations, precision may be improved, but at the expense of recall, a phenomena referred to herein as "the precision/recall tradeoff"

In one embodiment, the precision improvement module 240 performs data segmentation activities to, for example, help improve the performance of the churn prediction engine 150. The precision improvement module 240 may alter the functioning of the feature engineering module 220 in selecting the training data. More specifically, the precision improvement module 240 may segment the training data into multiple "segmented training sets" based on certain features, attributes, or categories of subscribers that exhibit different responses than others. These segmentations may be performed on certain criteria that exhibit clusters of similarly-behaving subscribers.

For example, in one embodiment, the precision improvement module 240 segments training subscribers based on the length of their account history (e.g., account age, or subscription age). Sellers who have been long-time subscribers may behave differently than medium- or short-term subscribers (e.g., those with relatively-newer accounts). As such, the precision improvement module 240 may segment the training data into two or more training sets, such as, for example, a long-term set (e.g., account age>=1 year) and a short-term set (e.g., account age<1 years), or a long-term set (e.g., account age>=2 years), a medium-term set (e.g., account age>=6 months and <2 years), and a short-term set (e.g., account age<6 months).

In other embodiments, the precision improvement module 240 segments training data based on Gross Merchandise Value (GMV). For example, the precision improvement module 240 may segment sellers having a high tier GMV (e.g., GMV>=$150) and a low tier GMV (e.g., GMV<$150). Further, in some embodiments, the precision improvement module 240 segments on multiple attributes, such as a combination of account age and GMV.

After data segmentation, the model training module 230 generates multiple prediction models, one for each segmented training set. As such, each prediction model caters to (e.g., more precisely predicts) a certain segment of subscribers.

Once the prediction model(s) are generated by the model training module 230, as optionally coordinated by the precision improvement module 240, the churn prediction module 250 applies the prediction model(s) to one or more "target subscribers" (e.g., subscribers whose future subscription data is not yet known). In other words, the churn prediction module 250 applies recent target user data of the target subscriber to at least one of the generated prediction models to generate a churn prediction for the target subscriber (e.g., categorizing the target subscriber as either a churn or a survivor).

In the example embodiment, the churn prediction module 250 receives recent attribute data for the target subscriber. More specifically, because the prediction models operate based on a subset of attributes (e.g., the training attributes determined by the feature engineering module 220), the churn prediction module 250 receives recent data for the target subscriber for at least that particular subset of attributes. During application of the prediction model (e.g., the decision tree), the churn prediction module 250 traverses down the tree, starting from the root node. At each level of the descent, if the node is a non-leaf node, the churn prediction module 250 determines what attribute is associated with that node, computes or determines a target value for that attribute based on the target attribute data, compares the target value to the threshold value of the node, and makes a branching decision to one child or another. After the decision is made, the branch is taken, and the next node is investigated in similar fashion. This descent through the tree is taken until a leaf node is reached. The target subscriber is then categorized based on the leaf node at which the process has arrived, thereby generating a churn prediction for the target subscriber.

The churn prediction module 250 may also track the path through the decision tree, thereby identifying the results of each decision point at each node. The churn prediction module 250 may provide this data to an analyst (e.g., through a graphical user interface), thereby enabling the analyst to study the results of each step and possibly pinpoint influential data as to why the target user is likely to churn. Further, the churn prediction module 250 may also track the resultant target values for the target subscriber at each node. This data may provide an insight to analysts as to how close the target subscriber was to a particular threshold (e.g., barely on one side of the threshold) or how weighted the target subscriber was with regard to that attribute (e.g., heavily to one side of the threshold).

In some embodiments, the precision improvement model 240 also tracks repetitive false alarms generated by the prediction model(s) (e.g., during application of the prediction model(s) to target subscribers). If a particular subscriber is miscategorized as a churn for a pre-determined number of consecutive time periods (e.g., 3 months or 6 months in a row), or a pre-determined number of time periods within a fixed window (e.g., 4 months of the most recent 6 month period), then the subscriber may be considered resistive to churn, and the precision improvement model 240 may relabel that subscriber as a survivor. As such, during later evaluations, this "resistive subscriber" may be categorized as a survivor regardless of the churn prediction model.

Analysts may study the results generated for the target subscriber by the prediction model(s) and, for those predicted as churns, the analysts may approach the subscribers and attempt to mitigate some of the factors causing the subscriber to be likely to churn.

Further, the precision improvement module may apply the prediction model(s) to many subscribers. Depending on the number of subscribers analyzed, this may generate a set of subscribers likely to churn, but that set may be too large to feasibly address (e.g., due to constraints such as logistics, costs, or time constraints). As such, the prediction ranking module 260 ranks the target subscribers to generate a ranked list from which the analyst may work.

More specifically, in one embodiment, the algorithm for ranking all customers based on an attribute or feature attr (e.g., GMV). Further, step size is a user defined value which indicates the range of attr between which the subscribers are treat almost the same (e.g., $10). Initial_offset is the smallest value of this attribute from which we start counting the step size. Presume the subscriber data is stored in a dataframe temp. The below example code is in the statistics programming language "R", and tags every customer with a rank based upon its attribute value. This algorithm adopts the paradigm of divide and conquer similar to merge sort:

```
v <- seq(initial_offset,max(attr),step_size)
temp <- cbind(temp,bin = findInterval(temp,v))
rank <- unique(temp$bin)
rank <- sort(rank)
matchfunc <- function(x) match(x,rank)
temp <- cbind(temp,rank=sapply(temp$bin,matchfunc))
temp <- temp[order(rank)]
temp <- mergerank(temp,highest_{rank}, lowest_{rank}, attr) {
```

```
width = max(df[,get(attr)]) - min(df[,get(attr)])
width = width/ranks      #ranks[division by zero!]
if (width <= 0 ) return(df)
stat = ggplot2:::(df[,get(attr)],binwidth=width)
maxbin = max(stat$count)
lwrrank = (ranks/2)
if (maxbin > MAX__CUSTOMERS__PER__RANK && lwrrank >=
1 &&
(ranks > lwrrank) &&width > 1) {
    lwrmedian = (nrow(df)/2)
    lwrhalf = [1:lwrmedian,]
    uprhalf = [(lwrmedian+1):(df),]
    lwrhalf <- mergerank(lwrhalf,lwrrank,offset,attr)
    uprhalf <- mergerank(uprhalf,ranks-lwrrank,offset +
        lwrrank,attr)
    df <- rbind(lwrhalf,uprhalf)
} else {
    vrange <- seq(min(df[,get(attr)]),max(df[,get(attr)]),width)
    scaled__rank <-
        findInterval(df[,get(attr)],vrange,rightmost.closed =
        TRUE,all.inside = TRUE)
    scaled__rank <- scaled__rank + offset
    df <- cbind(df,srank = scaled__rank)
    return(df)
}
}
```

Considering computational performance, the churn prediction engine 150 may employ any of a number of enhancements to improve the efficiency and processing of the systems and methods described herein. For example, Weka may be used for modeling, and R may be used for exploratory analysis. For another example, historical data for subscribers and their associated information may be stored in a variety of databases that may not be optimized for these operations, or the data may reside primarily in production databases that may not be able to support or accommodate the operations described herein. As such, the historical data and target data may be stored in a secondary database, or in a data warehouse (e.g., where data is synced from a production database on a periodic basis). Further, an attribute aggregator or pre-processor may query a large set of data to, for example, generate a subset of attribute data for a set of subscribers (e.g., only 30 pre-selected attributes), or a subset of subscribers' data (e.g., only newer subscribers), or a particular time period of subscribers' data (e.g., the last 1 year of data). As such, this pre-processing may improve the performance of the churn prediction engine 150 by, for example, clearing away extraneous data, or data that is not used by these systems and methods.

Figure 3:
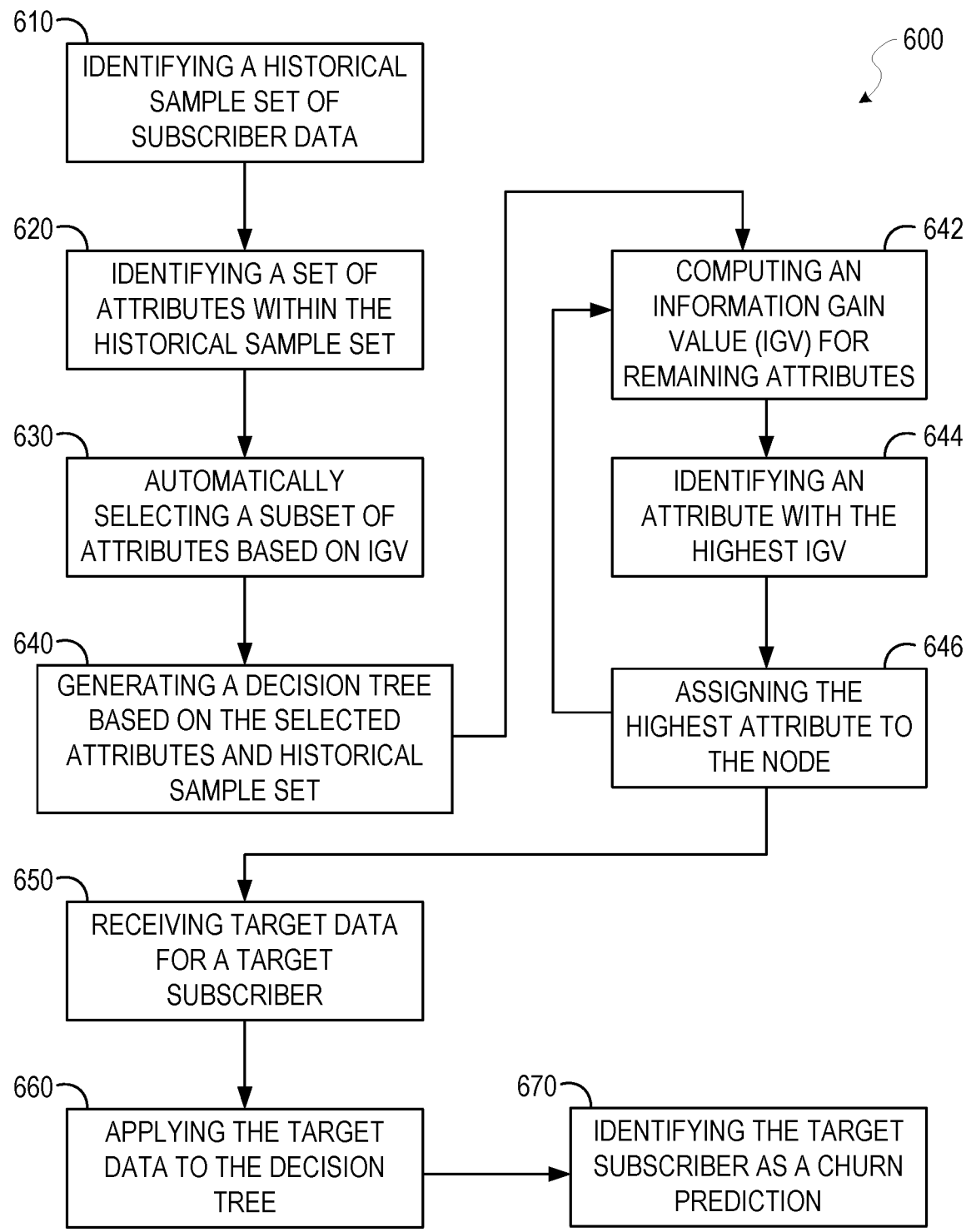
FIG. 3 illustrates a computerized method, in accordance with an example embodiment, for predicting churn.

FIG. 3 illustrates a computerized method 600, in accordance with an example embodiment, for predicting churn. The computerized method 600 is performed by a computing device comprising at least one processor and a memory. In the example embodiment, the computerized method 600 includes identifying a historical sample set of subscriber data in a memory at operation 610. The method 600 also includes identifying a set of attributes within the historical sample set at operation 620. The method 600 further includes automatically selecting a subset of attributes from the set of attributes based on an information gain value of each attribute of the set of attributes at operation 630. In some embodiments, automatically selecting the subset of attributes at operation 630 further includes selecting attributes having information gain value above a pre-determined threshold.

At operation 640, the method 600 includes generating a decision tree based on the selected subset of attributes and the historical sample set. Generating the decision tree (e.g., operation 640) further includes recursively generating nodes of the decision tree starting from a root node. Each non-leaf node of the decision tree representing an attribute from the subset of attributes. Generating a first non-leaf node of the decision tree includes computing an information gain value for each remaining attribute of the subset of attributes at operation 642, identifying a highest attribute having the highest information gain value at operation 644, and assigning the highest attribute to the first non-leaf node at operation 646.

At operation 650, the method 600 includes receiving target data for a target subscriber, the target data including each attribute in the subset of attributes. At operation 660, the method 600 includes applying the target data to the decision tree, thereby generating a churn prediction for the target subscriber. At operation 670, the method includes identifying the target subscriber as a churn prediction.

In some embodiments, the method 600 includes computing the information gain value of each attribute of the set of attributes, wherein automatically selecting the subset of attributes further includes selecting a pre-determined number of attributes having the highest information gain value. In some embodiments, the method 600 includes receiving indication of an analyst-identified attribute, and adding the analyst-identified attribute to the selected subset of attributes for inclusion generating the decision tree. In some embodiments, identifying the historical sample set at operation 610 further includes selecting the historical sample set from a pool of historical samples based on a distribution of a feature space of the pool of historical samples, wherein selecting the historical sample set further includes clustering the historical samples into K clusters, and performing stratified subsampling of the historical samples using the K clusters as strata.

In some embodiments, the decision tree includes a leaf node, and generating the decision tree at operation 640 further includes biasing the leaf node as a survivor if a percentage of remaining samples at the leaf node labeled as churns are above a pre-determined threshold, the pre-determined threshold is higher than 50%. In some embodiments, identifying the historical sample set at operation 610 further includes selecting the historical sample set from a pool of historical samples, the selecting including segmenting the historical sample set of subscriber data based on one or more of account age, subscription age, and gross merchandise value (GMV).

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1 and 2 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Figure 4:
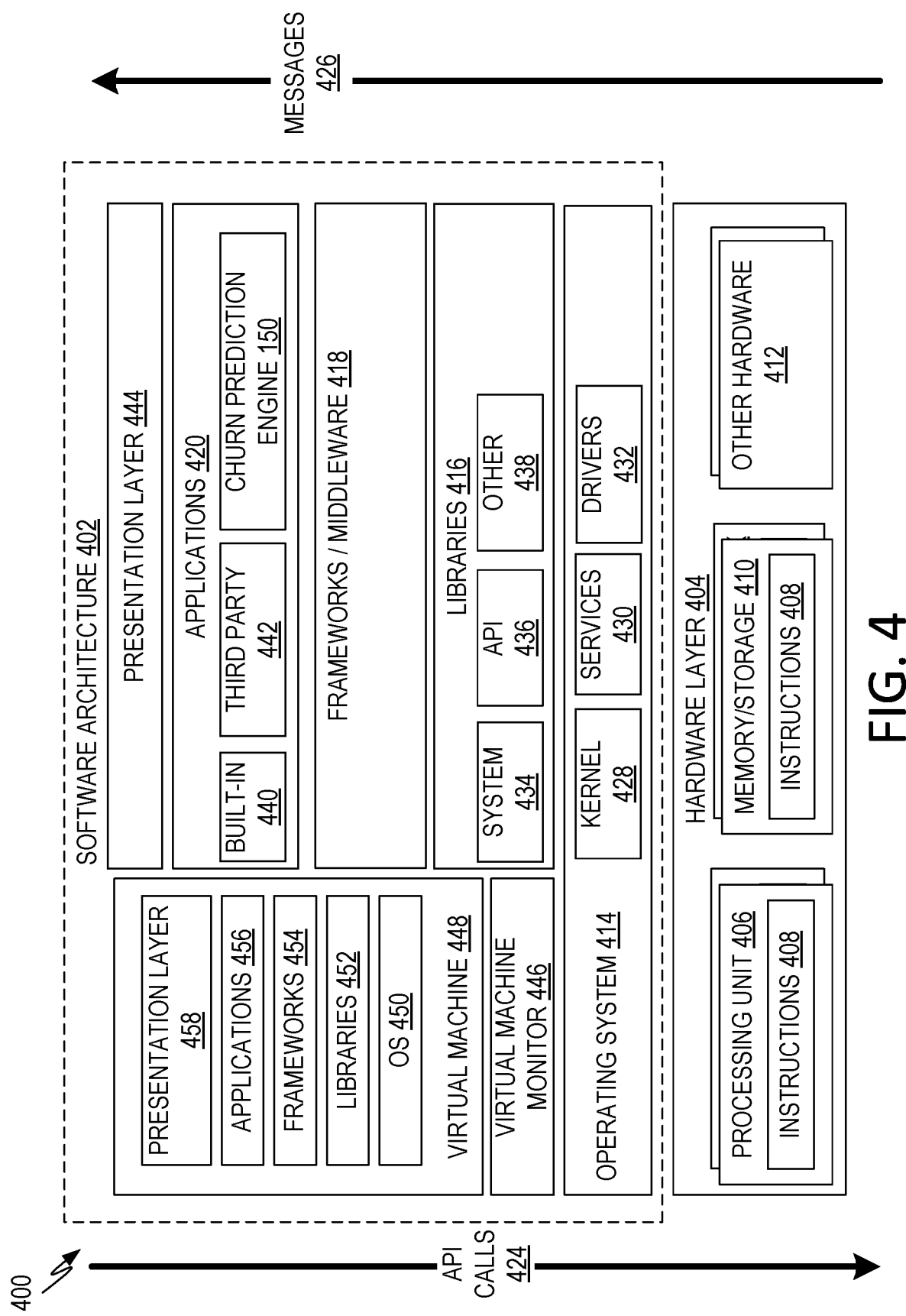
FIG. 4 is a block diagram illustrating a representative software architecture, which may be used in conjunction with various hardware architectures herein described.

FIG. 4 is a block diagram 400 illustrating a representative software architecture 402, which may be used in conjunction with various hardware architectures herein described. FIG. 4 is merely a non-limiting example of a software architecture and it will be appreciated that many other architectures may be implemented to facilitate the functionality described herein. The software architecture 402 may be executing on hardware such as machine 500 of FIG. 5 that includes, among other things, processors 510, memory 530, and I/O components 550. A representative hardware layer 404 is illustrated and can represent, for example, the machine 500 of FIG. 5. The representative hardware layer 404 comprises one or more processing units 406 having associated executable instructions 408. Executable instructions 408 represent the executable instructions of the software architecture 402, including implementation of the methods, modules and so forth of FIGS. 1 and 2. Hardware layer 404 also includes memory or storage modules 410, which also have executable instructions 408. Hardware layer 404 may also comprise other hardware as indicated by 412 which represents any other hardware of the hardware layer 404, such as the other hardware illustrated as part of machine 500.

In the example architecture of FIG. 4, the software 402 may be conceptualized as a stack of layers where each layer provides particular functionality. For example, the software 402 may include layers such as an operating system 414, libraries 416, frameworks/middleware 418, applications 420 and presentation layer 422. Operationally, the applications 420 or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be utilized by the applications 420 or other components or layers. The libraries 416 typically provide functionality that allows other software modules to perform tasks in an easier fashion than to interface directly with the underlying operating system 414 functionality (e.g., kernel 428, services 430 or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 or other software components/modules, some of which may be specific to a particular operating system or platform.

The applications 420 includes built-in applications 440 or third party applications 442. Examples of representative built-in applications 440 may include, but are not limited to, a contacts application, a browser application, a book reader application, a location application, a media application, a messaging application, or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 442 may invoke the API calls 424 provided by the mobile operating system such as operating system 414 to facilitate functionality described herein.

The applications 420 may utilize built in operating system functions (e.g., kernel 428, services 430 or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware machine (such as the machine of FIG. 5, for example). A virtual machine is hosted by a host operating system (operating system 414 in FIG. 4) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks/middleware 454, applications 456 or presentation layer 458. These layers of software architecture executing within the virtual machine 448 can be the same as corresponding layers previously described or may be different.

In the example embodiment, the churn prediction engine 150 operates as an application in the applications 420 layer. However, in some embodiments, the churn prediction engine 150 may operate in other software layers, or in multiple software layers (e.g., framework 418 and application 420), or in any architecture that enables the systems and methods as described herein.

Figure 5:
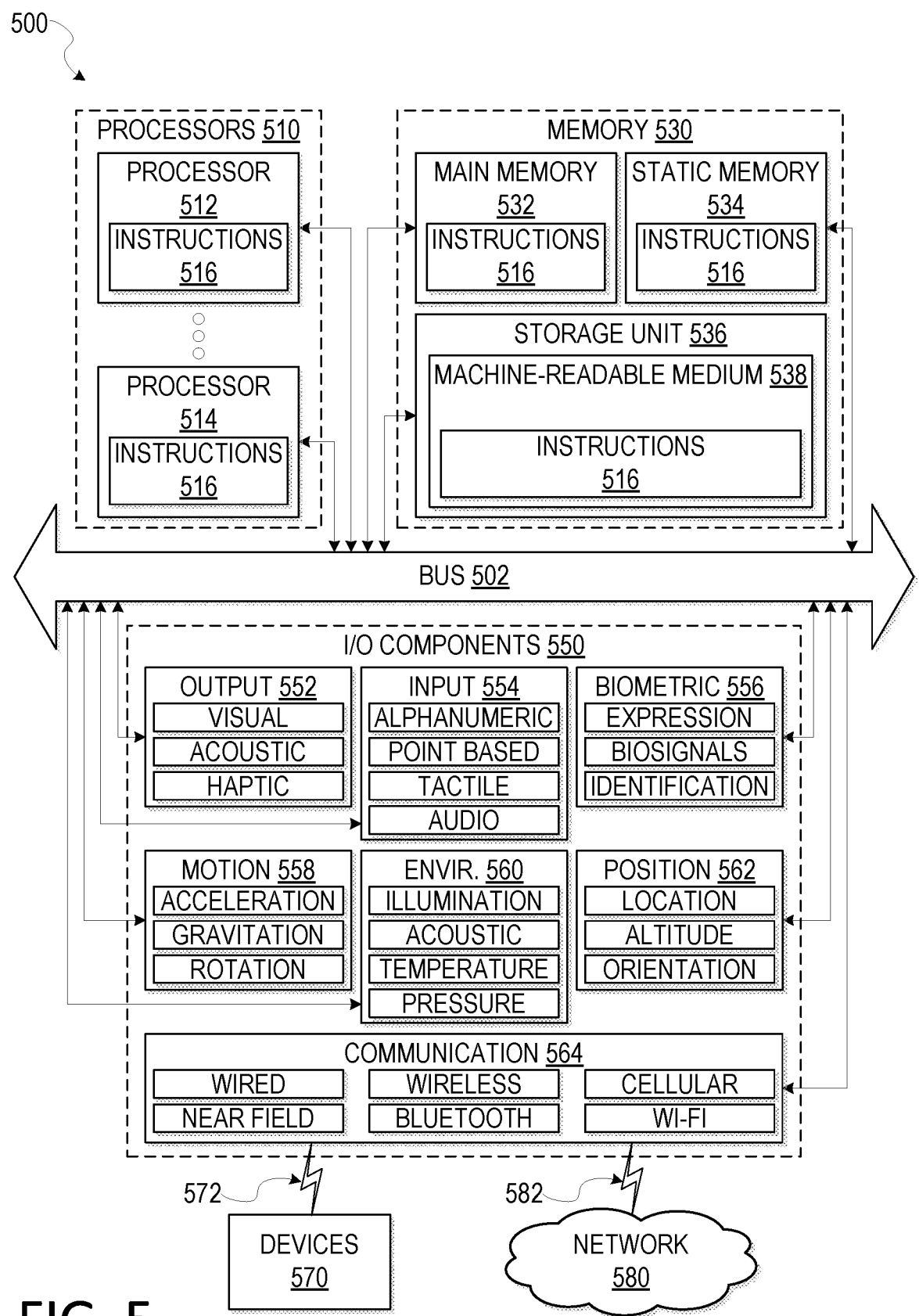
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium 538) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions may cause the machine to execute the user interactions module 210, external site communications module 220, graphing module 230, community analysis module 240, and bidding module 250, and so forth. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A churn prediction system comprising:
  at least one hardware processor;
  an electronic memory storing instructions that when executed configure the at least one hardware processor to perform operations comprising:
    identifying a historical sample set of subscriber data from a pool of historical samples stored in a database;
    segmenting the historical sample set of subscriber data based at least in part on one or more of account age, subscription age, and gross merchandise value (GMV);
    automatically selecting, using machine learning, a subset of attributes from a set of attributes of the segmented historical sample set of subscriber data based at least in part on an information gain value of each attribute of the set of attributes;
    ranking each attribute in the subset of attributes using the machine learning;
    generating a decision tree by assigning non-leaf nodes of the decision tree to corresponding attributes in the selected subset of attributes, each non-leaf node arranged in the decision tree according to the rank of the attribute assigned to the non-leaf node using the machine learning;
    generating, using a programming language for analysis, a plurality of churn predictions for a plurality of target subscribers based at least in part on the decision tree and target data for the plurality of target subscribers stored in the database, each churn prediction of the plurality of churn predictions indicating a churn likelihood of a corresponding target subscriber of the plurality of target subscribers;
    generating a ranked list of the plurality of target subscribers based at least in part on the plurality of churn predictions; and
    causing presentation of the ranked list via a graphical user interface.

2. The churn prediction system of claim 1, wherein the operations further comprise computing the information gain value of each attribute of the set of attributes, wherein automatically selecting the subset of attributes further includes selecting a pre-determined number of attributes having a highest information gain value.

3. The churn prediction system of claim 1, wherein automatically selecting the subset of attributes further includes selecting attributes having information gain values above a pre-determined threshold.

4. The churn prediction system of claim 1, wherein the operations further comprise:
  receiving an indication of an analyst-identified attribute; and
  adding the analyst-identified attribute to the selected subset of attributes for inclusion generating the decision tree.

5. The churn prediction system of claim 1, wherein the operations further comprise:
  identifying the historical sample set of subscriber data based at least in part on selecting the historical sample set of subscriber data from the pool of historical samples based at least in part on a distribution of a feature space of the pool of historical samples, wherein selecting the historical sample set of subscriber data further includes:
    clustering the historical samples into K clusters; and
    performing stratified subsampling of the historical samples using the K clusters as strata.

6. The churn prediction system of claim 1, wherein generating the decision tree further includes biasing a leaf node as a survivor if a percentage of remaining samples at the leaf node labeled as churns are above a pre-determined threshold, the pre-determined threshold is higher than 50%.

7. A computer-implemented method for predicting churn comprising:
  identifying a historical sample set of subscriber data from a pool of historical samples stored in a database;
  segmenting the historical sample set of subscriber data based at least in part on one or more of account age, subscription age, and gross merchandise value (GMV);
  automatically selecting, using machine learning, a subset of attributes from a set of attributes of the segmented historical sample set of subscriber data based at least in part on an information gain value of each attribute of the set of attributes;
  ranking each attribute in the subset of attributes using the machine learning;
  generating a decision tree by assigning non-leaf nodes of the decision tree to corresponding attributes in the selected subset of attributes, each non-leaf node arranged in the decision tree according to the rank of the attribute assigned to the non-leaf node using the machine learning;
  generating, using a programming language for analysis, a plurality of churn predictions for a plurality of target subscribers based at least in part on the decision tree and target data for the plurality of target subscribers stored in the database, each churn prediction of the plurality of churn predictions indicating a churn likelihood of a corresponding target subscriber of the plurality of target subscribers;
  generating a ranked list of the plurality of target subscribers based at least in part on the plurality of churn predictions; and
  causing presentation of the ranked list via a graphical user interface.

8. The method of claim 7, further comprising computing the information gain value of each attribute of the set of attributes, wherein automatically selecting the subset of attributes further includes selecting a pre-determined number of attributes having a highest information gain value.

9. The method of claim 7, wherein automatically selecting the subset of attributes further includes selecting attributes having information gain values above a pre-determined threshold.

10. The method of claim 7, further comprising:
  receiving indication of an analyst-identified attribute; and
  adding the analyst-identified attribute to the selected subset of attributes for inclusion generating the decision tree.

11. The method of claim 7, further comprising:
  identifying the historical sample set of subscriber data based at least in part on selecting the historical sample set of subscriber data from the pool of historical samples based at least in part on a distribution of a feature space of the pool of historical samples, wherein selecting the historical sample set of subscriber data further includes:

clustering the historical samples into K clusters; and
performing stratified subsampling of the historical samples using the K clusters as strata.

12. The method of claim 7, wherein the decision tree includes a leaf node, wherein generating the decision tree further includes biasing the leaf node as a survivor if a percentage of remaining samples at the leaf node labeled as churns are above a pre-determined threshold, the pre-determined threshold is higher than 50%.

13. A non-transitory machine-readable medium storing processor-executable instructions which, when executed by a hardware processor, cause the hardware processor to perform operations comprising:

identifying a historical sample set of subscriber data from a pool of historical samples stored in a database;

segmenting the historical sample set of subscriber data based at least in part on one or more of account age, subscription age, and gross merchandise value (GMV);

automatically selecting, using machine learning, a subset of attributes from a set of attributes of the segmented historical sample set of subscriber data based at least in part on an information gain value of each attribute of the set of attributes;

ranking each attribute in the subset of attributes using the machine learning;

generating a decision tree by assigning non-leaf nodes of the decision tree to corresponding attributes in the selected subset of attributes, each non-leaf node arranged in the decision tree according to the rank of the attribute assigned to the non-leaf node using the machine learning;

generating, using a programming language for analysis, a plurality of churn predictions for a plurality of target subscribers based at least in part on the decision tree and target data for the plurality of target subscribers stored in the database, each churn prediction of the plurality of churn predictions indicating a churn likelihood of a corresponding target subscriber of the plurality of target subscribers;

generating a ranked list of the plurality of target subscribers based at least in part on the plurality of churn predictions; and causing presentation of the ranked list via a graphical user interface.

14. The non-transitory machine-readable medium of claim 13, wherein the processor-executable instructions further cause the hardware processor to compute the information gain value of each attribute of the set of attributes, wherein automatically selecting the subset of attributes further includes selecting a pre-determined number of attributes having a highest information gain value.

15. The non-transitory machine-readable medium of claim 13, wherein automatically selecting the subset of attributes further includes selecting attributes having information gain values above a pre-determined threshold.

16. The non-transitory machine-readable medium of claim 13, wherein the decision tree includes a leaf node, wherein generating the decision tree further includes biasing the leaf node as a survivor if a percentage of remaining samples at the leaf node labeled as churns are above a pre-determined threshold, the pre-determined threshold is higher than 50%.

17. The churn prediction system of claim 1, wherein the machine learning is Waikato Environment for Knowledge Analysis (WEKA) machine learning.

18. The churn prediction system of claim 17, wherein the machine learning uses an attribute evaluator of WEKA.

* * * * *